US012154551B2

(12) United States Patent
Wolff et al.

(10) Patent No.: US 12,154,551 B2
(45) Date of Patent: Nov. 26, 2024

(54) DETERMINING WHETHER AN ACOUSTIC EVENT ORIGINATED INSIDE OR OUTSIDE A VEHICLE

(71) Applicant: Cerence Operating Company, Burlington, MA (US)

(72) Inventors: Tobias Wolff, Ulm (DE); Markus Buck, Ulm (DE); Jonas Jungclaussen, Ulm (DE); Amaury Astier, Ulm (DE); Tim Haulick, Ulm (DE)

(73) Assignee: Cerence Operating Company, Burlington, MA (US)

( * ) Notice: Subject to any disclaimer, the term of this patent is extended or adjusted under 35 U.S.C. 154(b) by 221 days.

(21) Appl. No.: 17/700,779

(22) Filed: Mar. 22, 2022

(65) Prior Publication Data

US 2022/0319502 A1 Oct. 6, 2022

Related U.S. Application Data

(60) Provisional application No. 63/167,688, filed on Mar. 30, 2021.

(51) Int. Cl.
| | |
|---|---|
| *G10L 15/16* | (2006.01) |
| *G10L 15/08* | (2006.01) |
| *G10L 15/22* | (2006.01) |
| *H04R 1/08* | (2006.01) |

(52) U.S. Cl.
CPC .............. *G10L 15/16* (2013.01); *G10L 15/22* (2013.01); *H04R 1/08* (2013.01); *G10L 2015/088* (2013.01); *G10L 2015/223* (2013.01)

(58) Field of Classification Search
CPC ... G10L 15/16; G10L 15/22; G10L 2015/088; G10L 2015/223; H04R 1/08
See application file for complete search history.

(56) References Cited

U.S. PATENT DOCUMENTS

| | | | |
|---|---|---|---|
| 2015/0380013 A1* | 12/2015 | Nongpiur | G10L 25/51 704/231 |
| 2018/0005512 A1* | 1/2018 | Ran | B60H 1/00757 |
| 2019/0057596 A1* | 2/2019 | Desai | B60Q 5/005 |
| 2021/0005067 A1* | 1/2021 | Salekin | G08B 13/1672 |
| 2022/0272448 A1* | 8/2022 | Rajkumar | B60W 50/00 |
| 2023/0097089 A1* | 3/2023 | Kobayashi | B60R 11/02 704/233 |

* cited by examiner

*Primary Examiner* — Sonia L Gay
(74) *Attorney, Agent, or Firm* — Occhiuti & Rohlicek LLP (57) ABSTRACT

A vehicle defines an interior space and an exterior space. Within the vehicle are internal microphones that are disposed to capture an acoustic event that originated in an origination space, which is either the interior space or the exterior space. An infotainment system includes circuitry that forms a head unit having an acoustic-signal processor that is configured to receive, from the microphones, a sound vector indicative of the acoustic event and to identify the origination space based at least in part on the sound vector.

18 Claims, 4 Drawing Sheets

DETERMINING WHETHER AN ACOUSTIC EVENT ORIGINATED INSIDE OR OUTSIDE A VEHICLE

RELATED APPLICATIONS

This application claims the benefit of the Mar. 30, 2021 priority date of U.S. Provisional Application 63/167,688, the contents of which are incorporated herein by reference.

FIELD OF INVENTION

The invention relates to infotainment systems, and in particular, to using an infotainment system to promote safety of occupants in a vehicle.

BACKGROUND

A variety of devices are known to assist in providing safety to occupants of vehicles. These range from seat belts to air bags, padded steering wheels, and the like.

Many vehicles also include an infotainment system in which microphones and loudspeakers link to a processor located in a head unit. It is known to use infotainment systems to inform and entertain occupants of a vehicle as they travel to a destination.

Upon arrival at their destination, the occupants typically turn off the vehicle and leave. As a result, the infotainment system is no longer active.

In some cases, not all occupants leave the vehicle. This is particularly common when it is inconvenient for all occupants to leave and the parking period is expected to be brief. In other cases, an occupant is inadvertently left behind during a parking period. In either case, the occupant left behind may experience environmental discomfort. For those occupants unable to leave the vehicle on their own, this environmental discomfort may become dangerous over time.

SUMMARY

The invention is based on the recognition that certain features of an infotainment system can be used to detect sounds that occur within a parked vehicle, thereby promoting safety of occupants in the parked vehicle.

In one aspect, the invention includes a non-abstract method that includes causing a head unit in a parked vehicle to draw attention to a sound that occurs within that vehicle's cabin. Examples of such a sound include those made by a living being in the vehicle and sounds indicative of a potential intrusion or attempt at intrusion into the vehicle. Attention is drawn by having the head unit use an array of microphones to monitor the cabin for out-of-domain sounds and to detect a signal originating within the cabin, the signal being an acoustic signal that is representative of an out-of-domain sound. In some embodiments, the head unit classifies the acoustic signal as being indicative of the existence of the living being and determines whether or not the sound originated from within the cabin of the vehicle. In other embodiments, the head unit classifies the acoustic signal as being indicative of an intrusion or attempt at intrusion. In either case, the head unit sends an alert to a person.

In one aspect, the invention includes an infotainment system in a vehicle. The vehicle defines an interior space and an exterior space. Within the vehicle are internal microphones that are disposed to capture an acoustic event that originated in an origination space, which is either the interior space or the exterior space. The infotainment system includes circuitry that forms a head unit having an acoustic-signal processor that is configured to receive, from the microphones, a sound vector indicative of the acoustic event and to identify the origination space based at least in part on the sound vector.

In some embodiments, the acoustic-signal processor includes an origination-space identifier that receives the sound vector, an acoustic-event detector that receives an element of the sound vector, and an information-fusion unit that receives an alert signal from the acoustic-event detector and a score signal from the origination-space identifier and determines, based at least in part on the alert signal and the score signal, that an emergency exists in the vehicle.

Among these embodiments are those in which the origination-space identifier includes a spectral projector that outputs a value indicative of a similarity between a power-spectral-density vector corresponding to the sound vector and a reference vector. In some of these embodiments, origination-space identifier also includes a reference-vector repository that stores a collection of reference vectors, among which is the reference vector.

Embodiments that include an origination-space identifier include those in which the origination-space identifier includes a sound transformer that generates the power-spectral density vector from the sound vector and those in which it includes estimation circuitry that receives a spectral projection of a power-spectral-density vector and a reference vector and normalizes the spectral projection, and those in which the origination-space identifier is configured to estimate the origination space based on a cosine of an angle between a power-spectral-density vector and a reference vector, the power-spectral-density vector having been derived from the sound vector and the reference vector having been retrieved from a stored set of reference vectors.

Embodiments that include the information-fusion unit include those in which the information-fusion unit determines whether the captured acoustic event corresponds to an acoustic event that was determined to originate in the interior, those in which the information-fusion unit is configured to inspect a time segment corresponding to a time of the captured acoustic event and to determine whether the time segment includes an acoustic event that originated in the interior, and those in which the information-fusion unit includes a buffer that stores information concerning time segments most recently analyzed by the origination-space identifier.

Among the embodiments that include an acoustic-event detector are those in which the acoustic-event detector includes a neural network, those in which the acoustic-event detector determines whether the captured acoustic event is likely to be a distress call from a living being, and those in which the acoustic-event detector compares the captured acoustic event with samples of distress calls from a living being.

Still other embodiments feature a notification module that receives a trigger signal from an information-fusion module and, in response, alerts a recipient to an emergency in the vehicle. Among these are embodiments in which the notification module includes a contact list that lists candidate recipients for a message from the notification module, wherein the recipient is among the candidate recipients and those in which the recipient is an alarm system of the vehicle. In such embodiments, in response to having been alerted, the alarm system generates a signal to draw attention to the vehicle, the signal being selected from the group consisting of an acoustic signal and a visual signal.

In some embodiments, the recipient of an alert from a notification module receives an alert that enables the recipient to listen to acoustic activity in the interior space using at least one of the microphones, to view activity in the interior space using a camera in the vehicle, or to enable the recipient to operate a climate-control system within the vehicle.

In another aspect, the invention features a method that includes comprising capturing an acoustic event using internal microphones that are inside a vehicle that defines an interior space and an exterior space, the acoustic event having originated in an origination space. The origination space is either the interior space or the exterior space. Such a method also includes identifying the origination space based at least in part on a sound vector obtained from the internal microphones.

Some practices of the method include, after having captured the acoustic event, determining that the acoustic event arose from a distress call made by a living being in the vehicle, determining that the acoustic event's origination space was the internal space, and notifying a recipient of an emergency in the vehicle.

A system and method as described herein reduces the risk of inadvertently leaving a living being inside a parked vehicle. This avoids the risk of heatstroke or death as a result of rising temperatures in a parked vehicle. The system and method also provides a safe way of allowing a child who has fallen asleep to allow the child to continue sleeping in a vehicle that has been parked in a way that avoids the risk of rising temperatures. When the child begins to stir, the system will send a signal to the caregiver, who will then be able to return to the vehicle as the child awakens.

The method and system described herein thus provides a way to detect acoustic events in a vehicle and to notify an appropriate person accordingly. A significant innovation arises from the ability to reliably determine whether a sound has originated from inside or outside the vehicle. This avoids the risk of false alarms triggered by acoustic scenery exterior to the vehicle.

The detection problem is thus split into two steps: that of detecting an acoustic event and that of determining whether the event occurred inside or outside the vehicle. Information arising from carrying out these steps is then combined in a third step to yield a result. In some embodiments, the probability that the result is correct increases with time as more information is gathered. As a result, it is useful to delay communication of the result until the confidence in the result has reached a threshold value.

The task of determining whether the acoustic event originated from inside or outside the vehicle is carried out using two or more microphones. A particularly useful feature is that even though sounds from outside the car will be detected, no exterior microphones are actually needed. The method can be carried out using only internal microphones, i.e., those that have a radiation pattern with a main lobe that is directed into the vehicle. These internal microphones are arranged in an array or arranged so as to be distributed within the interior but without the regular arrangement implied by an array. In a preferred embodiment, the microphones are arranged without the regular arrangement associated with an array.

The task of distinguishing between sounds of internal and external origin relies in part on the diffuse nature of sounds that originate outside the vehicle as perceived by microphones inside the vehicle. Embodiments of the apparatus thus inspect observed power spectral densities for the existence of certain expected ratios in power. A particularly simple feature to rely upon is the extent to which the power spectral densities are roughly the same at each microphone. This would suggest a sound that originated outside the vehicle. However, more sophisticated tests can also be used.

The task of detecting an acoustic event is based on a feed-forward artificial neural network that has been trained to distinguish the relevant sounds. In some embodiments, the artificial neural network is one that has been trained to distinguish between the voice of a child and that of an adult and those that have been trained to recognize various common background sounds that would not rise to the level of an acoustic event that is worthy of further consideration.

The head-unit and all associated computer-readable media are tangible and non-transitory and made of matter, preferably baryonic matter. During operation, the head unit consumes energy and generates waste heat. The method as described herein is carried out in the real world, as opposed to in the imaginary world, and has technical effects. Among these technical effects is that of improving a special-purpose computing system by causing the system to possess an attribute that it did not formerly possess.

These and other features will be apparent from the accompanying detailed description, in which:

DETAILED DESCRIPTION

Figure 1:
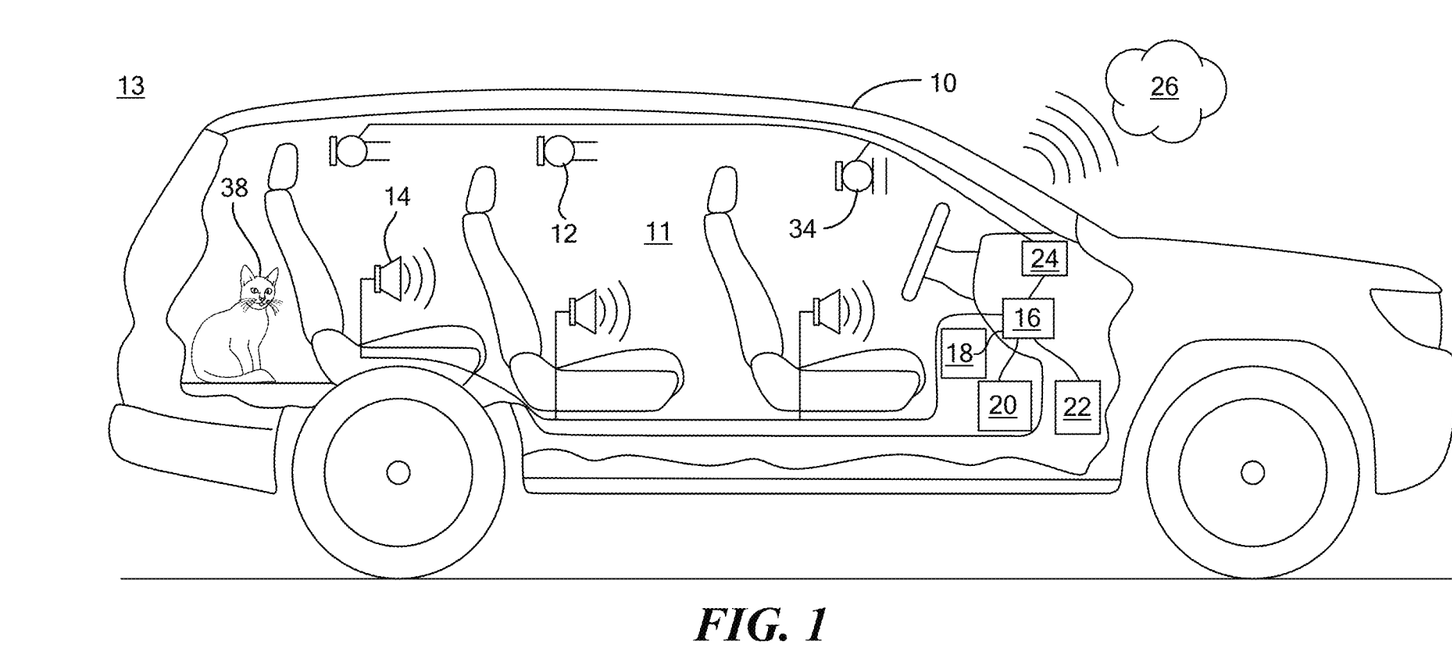
FIG. 1 shows a vehicle having a monitor in communication with a head unit.

FIG. 1 shows a vehicle 10 that defines an interior space 11 and an exterior space 13. An acoustic event originates in an origination space, which is either the interior space 11 or the exterior space 13. In some cases, it is useful to identify which of the interior space 11 and exterior space 13 is the origination space for an acoustic event.

The vehicle 10 has plural microphones 12 and speakers 14 that are strategically placed near expected positions of occupants. In a typical four-passenger vehicle 10, there are four such microphones 12, one for each passenger. A multi-purpose head unit 16 implements an infotainment system 22 provides control over the microphones 12 and the speakers 14 in such a way as to promote more convenient communication between the occupants.

Each microphone 12 outputs a time-varying signal. In normal operation, the microphones 12 operate separately. However, it is also possible to operate the microphones 12 as an array. When doing so, the spatial diversity of the microphones 12, i.e., the fact that they are in different locations, permits additional information to be extracted from the acoustic scene. This additional information arises because each microphone 12 experiences the same acoustic event with different magnitudes and phases. The presence of this additional information provides a way to identify the origination space of an acoustic event more reliably.

It is useful to define a "sound vector" in which each element is an output of one of the microphones 12. The sound vector has an equivalent frequency-domain representation, the magnitude squared of which will be referred to herein as the "power-spectral-density vector." In a typical four-passenger vehicle 10, both the sound vector and the power-spectral-density vector are four-dimensional vectors in a four-dimensional microphone space.

The head unit 16 is also in communication with various other automotive systems. Among these are a GPS unit 18, which stores information concerning the vehicle's current location, and a climate-control system 20, which provides the head unit 16 with ways to control the cabin's environment, for example by turning on air-conditioning or heat, by turning a fan on or off, or by opening windows by a selected amount, and an alarm system 21, which can be seen in FIG. 4. The alarm system 21 is used not only to detect intruders but to also communicate the existence of an emergency within the vehicle 10. Also among these systems is a communication device 24, which uses any of a variety of communication modes, such as voice, text, and mail. A camera 34 permits video communication as well as monitoring the vehicle's interior.

In some embodiments, the head unit 16 also provides communication with a cloud service 26 from which it retrieves data that may be of use in various applications. Such information can include vehicle-identifying information.

Figure 2:
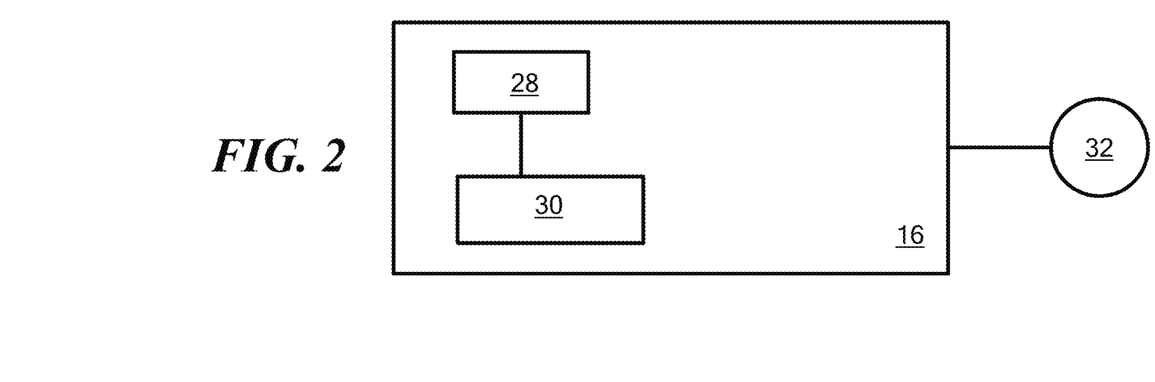
FIG. 2 shows hardware components of the head unit shown in FIG. 1.

Referring to FIG. 2, the head unit 16 comprises electronic hardware in which a processor 28 and a memory 30 are constituents of a special-purpose computer system. A battery 32 provides power to the head unit 16 when the vehicle 10 is parked. In some embodiments, the head unit 16 comprises one or more application-specific integrated circuits. These circuits comprise a semiconductor substrate having transistors interconnected thereon. In particular, these circuits differ from general-purpose digital computers.

Figure 3:
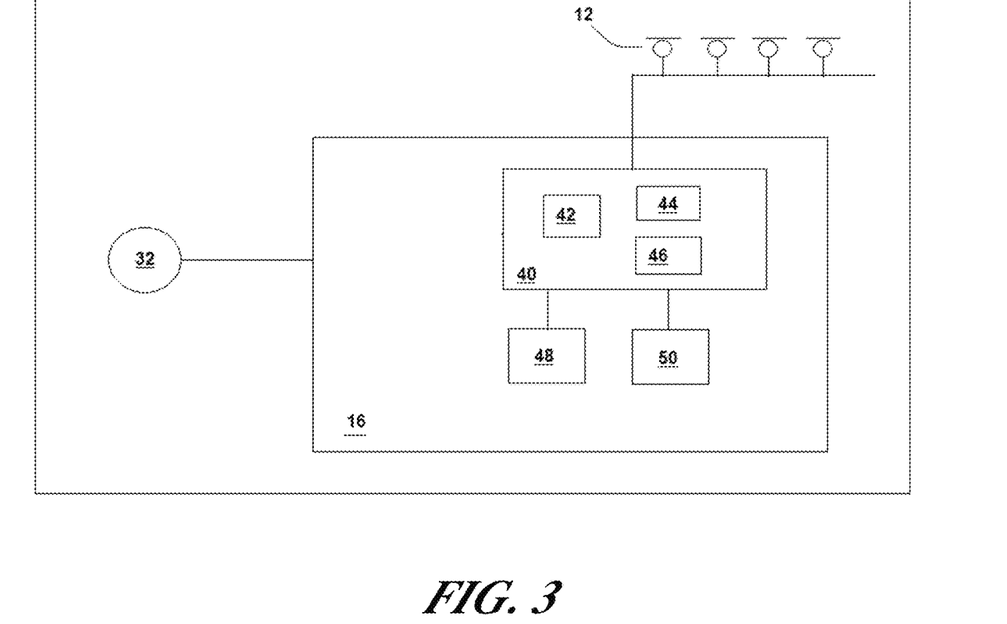
FIG. 3 shows internal architecture of the head unit shown in FIGS. 1 and 2.

FIG. 3 shows head-unit software 40 that includes a speech interface 42, an acoustic-signal processor 44, and a cloud service 46. The head-unit software 40 also provides application-program interfaces 48, 50 that are useful for interacting with various vehicle subsystems as well as for interacting with external systems, such as a phone.

In normal operation, the speech interface 42 listens for commands and carries out functions requested by such commands. Such speech commands are generally preceded by a wake-word that signals the speech interface that what comes next is a command. The speech interface 42 thus responds to "in-domain sounds," i.e., sounds that are directed to the speech interface 42. These in-domain sounds are distinct from "out-of-domain sounds," which include ambient conversation not directed to the speech interface as well as background noises.

Figure 4:
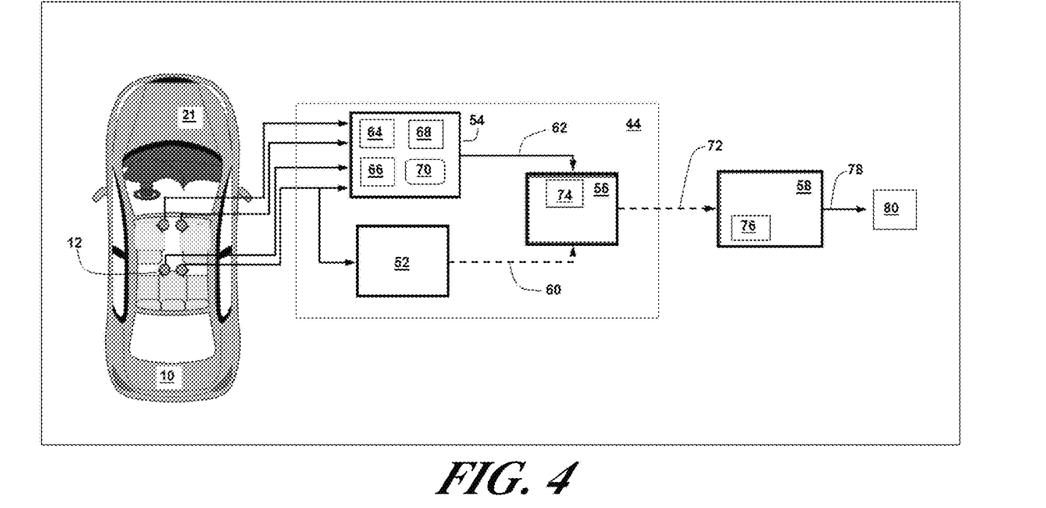
FIG. 4 shows the architecture of an acoustic-signal processor shown in FIG. 3.

Referring to FIG. 4, the acoustic-signal processor 44 includes an acoustic-event detector 52, an origination-space identifier 54, an information-fusion unit 56, and a notification module 58. These components cooperate to determine whether an out-of-domain sound that originated within the vehicle 10 is likely to be an emergency.

When the vehicle 10 is parked, the acoustic scene will generally be characterized by constant background that is sporadically interrupted by acoustic events. These acoustic events typically consist of out-of-domain sounds. An acoustic event may be significant or insignificant. Additionally, an acoustic event's origination space is either the interior space 11 or the exterior space 13.

The acoustic-signal processor 44 is intended to capture acoustic events, establish their significance, to identify its origination space, to determine if an emergency condition should be declared within the vehicle 10, and to alert appropriate parties in the event of such an emergency.

Of particular importance are acoustic events that originate in the interior space 11. Regrettably, it is not unheard of for a living being 38 to be left unattended in a vehicle 10. Depending on circumstances, this can develop into a life-threatening oversight.

Fortunately, living beings 38 tend to emit characteristic distress calls when faced with growing environmental discomfort. These distress calls tend to have distinctive acoustic signatures. For example, babies tend to whimper under such conditions. Dogs, because of their lack of sweat glands, attempt to dissipate heat by panting at high frequency. The acoustic-signal processor 44 attempts to detect these distress calls while a vehicle 10 is parked and to send an alert upon detection of such a distress call.

To achieve this, the acoustic-signal processor 44 carries out two distinct tasks: determining the nature of an acoustic event and determining whether the acoustic event originated inside or outside the vehicle 10. These tasks are carried out by the acoustic-event detector 52 and the origination-space identifier 54.

The acoustic-event detector 52 receives, over an acoustic channel thereof, an element of the sound vector. Based on this received element, the acoustic-event detector 52 determines whether an acoustic event has occurred. It then attempts to classify it.

The acoustic-event detector 52 stores acoustic signatures of various classes of events that are of interest. Examples of such acoustic signatures are samples of distress calls from living beings 38.

The acoustic-event detector 52 compares the received element of the sound vector with each of the acoustic signatures. For each comparison, the acoustic-event detector 52 determines a probability that the received element of the sound vector matches one of the stored acoustic signatures.

The result of the foregoing procedure is a set of probabilities, each of which corresponds to one of the stored acoustic signatures. One of these is the highest. The acoustic-event detector 52 determines whether the probability exceeds a threshold. If so, it sends an alert signal 60 to the information-fusion unit 56.

The alert signal 60 identifies which acoustic signature had the highest probability of matching the received acoustic signal and also includes a confidence measure indicating how likely it is that the acoustic signature and the detected sound are the result of the same phenomenon.

An important consideration is when the acoustic-event detector 52 will actually send the alert signal 60.

To maximize the probability of correctly classifying an acoustic event, it is useful to have a sound vector that lasts for a long time. On the other hand, if the acoustic event is one that is indicative of an emergency, one reaches a point of diminishing returns. The longer the sound vector, the less time will be available to respond adequately to the emergency.

In recognition of the above trade-off, the acoustic-event detector 52 sends information to the information-fusion unit 56 either at the end of the acoustic event or after the lapse of a pre-determined time-out period, whichever comes first.

The alert signal 60 identifies an acoustic signature that corresponds to the acoustic event. It also provides an accompanying confidence measure that indicates how likely it is that the acoustic signature and the acoustic event are the result of the same phenomenon. In addition, the alert signal 60 includes a start time for the acoustic event and either an ending time for the acoustic event or an observation time indicative of how long the acoustic event was observed.

A suitable implementation of an acoustic-event detector 52 relies on a neural network. Examples of suitable neural networks include a deep neural-network, a deconvolutional neural network, a convolutional neural network, and a recurrent neural network, such as a long-short-term memory neural network.

The origination-space identifier 54 receives the sound vector at the same time that the acoustic-event detector 52 is receiving an element of that sound vector. The sound vector amounts to a never-ending set of streams that represent the acoustic scene as heard from different microphones 12. Accordingly, the origination-space identifier 54 divides this stream into segments. For each segment, the origination-space identifier 54 determines whether the acoustic scene that occurred during that segment contained a sound that originated in the interior space 11. For each such segment, the origination-space identifier 54 outputs a score. This results in a score signal 62 that is provided to the information-fusion unit 56.

The scores in the score signal 62 are generated at a fixed frequency, for example once every twenty milliseconds. This would correspond to the temporal duration of each segment.

Each score is a number within a range of values. The position of the score within the range indicates the likelihood that the acoustic event's origination space is the interior space 11. In a preferred embodiment, the score is between zero and unity. Scores close to unity indicate an acoustic event that originated inside the vehicle 10. Conversely, scores close to zero indicate an acoustic event's origination space is the exterior space 13.

In a preferred embodiment, the inside-output detector 54 includes a sound transformer 64 and a spectral projector 66.

The sound transformer 64 transforms the sound vector from the time domain into the frequency domain, which it then uses to generate the power-spectral-density vector. In some embodiments, the sound transformer 64 makes use of phase information contained in the frequency-domain representation of the sound vector. In other embodiments, the sound transformer 64 relies on the norm squared of the frequency-domain representation.

The spectral projector 66 evaluates the projection of that power-spectral-density vector onto a reference vector, which is also in the frequency domain. The extent of that projection provides a basis for estimation circuitry 68 to estimate a likelihood that the acoustic event's origination space is the interior space 11.

A suitable sound transformer 64 is that used to obtain a Fourier transformation, such as that implemented by FFT circuitry. Reference vectors are retrieved from a pre-populated reference-vector repository 70.

A preferred embodiment of the origination-space identifier 54 estimates the likelihood using all available microphones 12. Doing so simplifies processing. In addition, the spatial diversity of the microphones 12 tends to improve detection performance. However, in some embodiments, the likelihood is obtained by using fewer than all microphones 12.

At this point, the acoustic-signal processor 44 will have two items of information: (1) a set of scores that indicates, for each time segment in a corresponding set of time segments whether an acoustic event is likely to have originated in the interior space 11 during that time segment and (2) an acoustic event that matched a distress call. One piece of information remains outstanding. The acoustic-signal processor 44 does not know if the acoustic event that matched a distress call also originated from the interior space 11. The purpose of the information-fusion unit 56 is to answer this question.

As noted above, the alert signal 60 contains a time and duration of the acoustic event. The information-fusion unit 56 retrieves the relevant segment and inspects its score to see if an acoustic signal occurring in that time segment was likely to have originated in the interior space 11. If so, the information-fusion unit 56 infers that a distress call originated in the interior space 11 and that the acoustic event detected by the acoustic-event detector 52 represents a bona fide emergency. Accordingly, the information-fusion unit 56 transmits a trigger signal 72 to the notification module 58.

One way to accomplish the foregoing alignment process is to provide the information-fusion unit 56 with a buffer 74 that buffers the most recent time-segments scores and their corresponding times as received from the origination-space identifier 54. A suitable buffer is a FIFO buffer that is usable as a look-back buffer or retrospective buffer.

The information-fusion unit 56 compares the start time and duration of the acoustic event identified in the alert signal 60 with acoustic events present in the time segments and estimates the probability that the two events correspond to each other. In some embodiments, the information-fusion unit 56 also calculates a confidence value for whether or not the two events correspond to each other. Based on the confidence value, the information-fusion unit 56 determines whether to send a trigger signal 72 to the notification module 58.

In response to the trigger signal 72, the notification module 58 sends an emergency message 78 to a recipient 80.

In some embodiments, the recipient 80 is a set of one or more parties who are in a position to do something about it. Depending on the manner in which the notification module 58 has been configured, such parties include one or more persons who have are registered in a contact list 76. Examples of such persons include those who have had contact information, such as telephone numbers, registered in the list, the person who activated the acoustic-signal processor 44, the person who locked the vehicle 10, or the person in possession of hardware required to operate the vehicle, such as car keys or fobs. In some embodiments, the notification module 58 sends a message that includes information concerning whatever the information-fusion module has been able to infer concerning the nature of the emergency.

In other embodiments, the recipient 80 of is the vehicle's alarm system. This is particularly useful since the vehicle's alarm system will immediately make loud noises that may draw attention to the living being's plight from those who are in a position to immediately take some action.

In some embodiments, the emergency message 78 provides a way for the recipient 80 to use the vehicle's telephone 24 to listen to the acoustic environment within the vehicle 10 or to communicate with the living being 38. For those vehicles that include a camera 34, there exists the possibility of a video call between the recipient 80 and the living being 38. In other embodiments, a message to the recipient 80 provides a way to remotely operate the climate-control system 20 to quickly relieve environmental discomfort.

Figure 5:
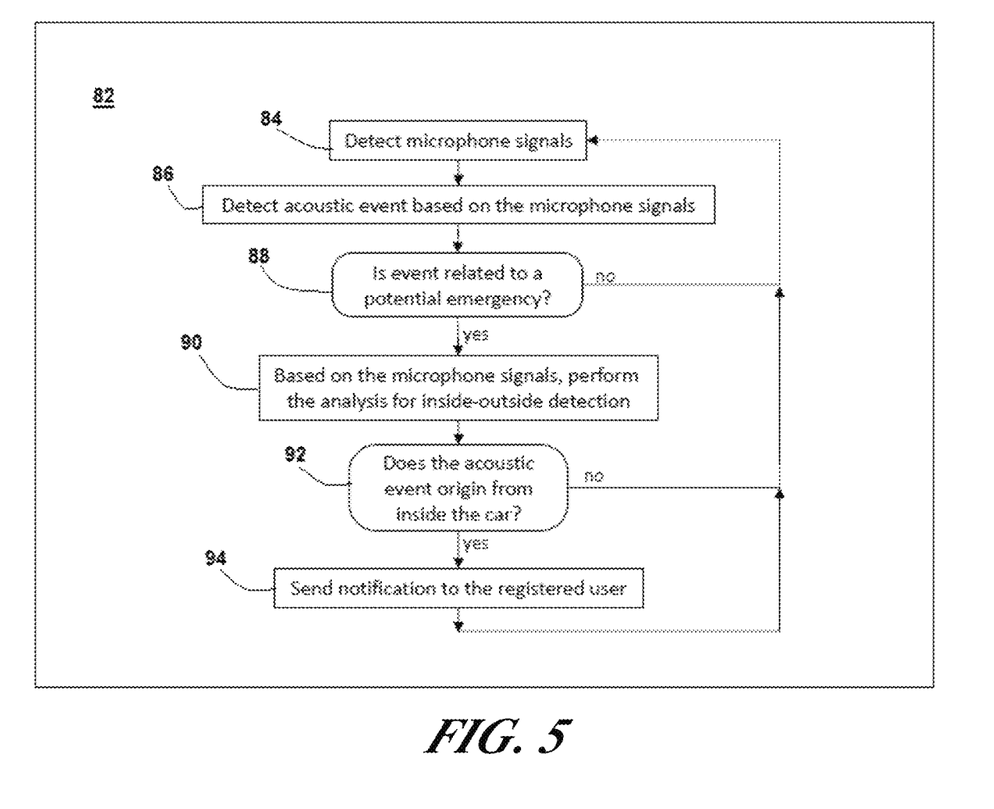
FIG. 5 is a flow chart showing a method carried out by the acoustic-signal processor of FIG. 4.

Referring now to FIG. 5, a process 82 executed by the acoustic-signal processor 44 includes monitoring a signal from the microphones 12 (step 84) and sporadically detecting an acoustic event (step 86). The acoustic signal processor 44 determines whether the acoustic event is likely to be indicative of an emergency (step 88). If the acoustic event is not indicative of a potential emergency, monitoring continues (step 84). Otherwise, the signals from the microphones 12 are used to estimate the likelihood that the acoustic event originated in the interior space 11 (step 90). The acoustic-signal processor 44 then determines whether the acoustic event is likely to have originated in the exterior space 13. If not, monitoring of the microphones 12 continues (step 84). Otherwise, a suitable notification is sent (step 92).

Figure 6:
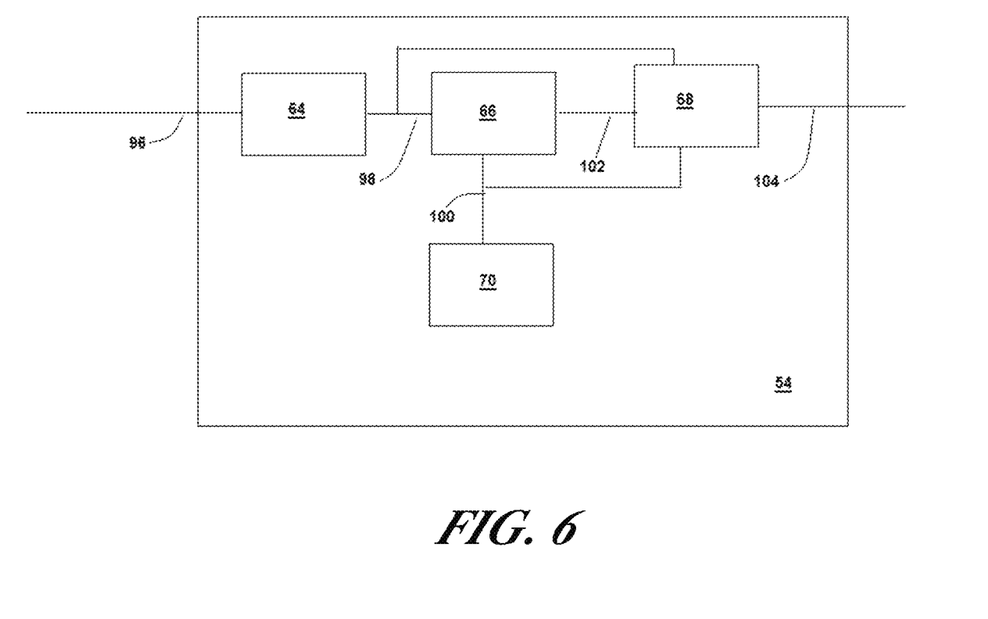
FIG. 6 shows details of the monitor shown in FIG. 4

FIG. 6 shows details of the operation of the origination-space identifier 54 from FIG. 4.

Operation begins with the sound transformer 64 receiving a set of time segments 96 from the sound vector. The sound transformer 64 obtains the Fourier transform of each time segment and uses that to form the power-spectral-density vector 98. The spectral projector 66 receives the power-spectral density vector 98 and retrieves a reference vector from the reference-vector repository 70. The spectral projector 66 then evaluates the inner product of the reference vector 100 and the power-spectral density vector 98 to yield a projection 102, the value of which is the product of the magnitudes of the power-spectral density vector 98 and the reference vector 100 weighted by a factor that depends on the cosine of the angle formed between the power-spectral density vector 98 and the reference vector 100.

The value of the projection 102 is thus confined to an interval on the real axis. For convenience, it is useful to normalize the projection 102 so that its value is instead between zero and unity. This step is carried out by the estimation circuitry 68, which receives both the power-spectral density vector 98 and the reference vector 100 for use in normalizing. The estimation circuitry 68 evaluates the inner product of the power-spectral density vector 98 and the reference vector 100 and divides the result by the product of the magnitudes of the inner product of the power-spectral density vector 98 and the reference vector 100. The output of the estimation circuitry 68 will thus have a magnitude that is between zero and unity. The normalized power-spectral-density vector can be viewed as simply being a system-transfer vector divided by the magnitude of the system-transfer vector. Each element of the system-transfer vector is the system-transfer function associated with one of the microphones 12.

The cosine of the angle is thus the inner product of a normalized power-spectral density vector and a normalized reference vector. The cosine is unity when the two vectors lie in the same direction in the four-dimensional microphone space. If the two vectors are orthogonal in the microphone space, the cosine vanishes.

The normalized power-spectral density vector can be viewed as an observed vector of relative transfer functions and the normalized reference vector is a model for relative transfer functions of the microphones 12. In the simplest case in which all microphone transfer functions are the same, each element of the normalized reference vector is simply the reciprocal of the square-root of the number of microphones 12.

The reference vectors from the repository 70 are generated by modeling the vehicle's acoustic environment to determine the transfer function associated with the vehicle 10. This can be carried out by obtaining the Fourier transform of the vehicle's response to an impulse, which would essentially be the vehicle's transfer function. Alternatively, it can be carried out by modeling the geometry of the vehicle 10 and determining a corresponding free sound field. In another alternative, the model relies on determining the acoustic field at a point in response to a source by combining a direct wave with reflected waves at that point, the reflections arising from reverberations from the vehicle's interior structures.

Having described the invention and a preferred embodiment thereof, what is claimed as new and secured by Letters Patent is:

1. An apparatus comprising an infotainment system in a vehicle, wherein the vehicle defines an interior space and an exterior space, wherein the vehicle is equipped with internal microphones that are disposed to capture an acoustic event that originated in an origination space, said origination space being one of said interior space and said exterior space, said infotainment system comprising circuitry that forms a head unit, wherein said head unit comprises an acoustic-signal processor that is configured to receive, from said microphones, a sound vector that is indicative of said acoustic event and to identify said origination space based at least in part on said sound vector, wherein said acoustic-signal processor comprises an origination-space identifier that receives said sound vector, an acoustic-event detector that receives an element of said sound vector, and an information-fusion unit that receives an alert signal from said acoustic-event detector and a score signal from said origination-space identifier and determines, based at least in part on said alert signal and said score signal, that an emergency exists in said vehicle.

2. The apparatus of claim 1, wherein said origination-space identifier comprises a spectral projector that outputs a value indicative of a similarity between a power-spectral-density vector corresponding to said sound vector and a reference vector.

3. The apparatus of claim 2, wherein said origination-space identifier comprises a reference-vector repository that stores a collection of reference vectors, among which is said reference vector.

4. The apparatus of claim 2, wherein said origination-space identifier comprises a sound transformer that generates said power-spectral density vector from said sound vector.

5. The apparatus of claim 2, wherein said origination-space identifier comprises estimation circuitry that receives a spectral projection of a power-spectral-density vector onto a reference vector and normalizes said spectral projection.

6. The apparatus of claim 1, wherein said origination-space identifier is configured to estimate said origination space based on a cosine of an angle between a power-spectral-density vector and a reference vector, said power-spectral-density vector having been derived from said sound vector and said reference vector having been retrieved from a stored set of reference vectors.

7. The apparatus of claim 1, wherein said information-fusion unit is configured to determine whether said captured acoustic event corresponds to an acoustic event that was determined to originate in said interior.

8. The apparatus of claim 1, wherein said information-fusion unit is configured to inspect a time segment corresponding to a time of said captured acoustic event and to determine whether said time segment includes an acoustic event that originated in said interior.

9. The apparatus of claim 1, wherein said information-fusion unit comprises a buffer that stores information concerning time segments most recently analyzed by said origination-space identifier.

10. The apparatus of claim 1, wherein said acoustic-event detector comprises a neural network.

11. The apparatus of claim 1, wherein said acoustic-event detector is configured to determine whether said captured acoustic event is likely to be a distress call from a living being.

12. The apparatus of claim 1, wherein said acoustic-event detector is configured to compare said captured acoustic event with samples of distress calls from a living being.

13. The apparatus of claim 1, further comprising a notification module that receives a trigger signal from said information-fusion module and, in response, alerts a recipient to an emergency in said vehicle.

14. The apparatus of claim 13, wherein said notification module comprises a contact list that lists candidate recipients for a message from said notification module, wherein said recipient is among said candidate recipients.

15. The apparatus of claim 13, wherein said recipient is an alarm system of said vehicle, wherein, in response to having been alerted, said alarm system generates a signal to draw attention to said vehicle, said signal being selected from the group consisting of an acoustic signal and a visual signal.

16. The apparatus of claim 13, wherein said recipient receives an alert that enables said recipient to listen to acoustic activity in said interior space using at least one of said microphones.

17. The apparatus of claim 13, wherein said recipient receives an alert that enables said recipient to view activity in said interior space using a camera in said vehicle.

18. The apparatus of claim 13, wherein said recipient receives an alert that enables said recipient to operate a climate-control system within said vehicle.

* * * * *